Patented Jan. 7, 1941

2,227,777

UNITED STATES PATENT OFFICE 2,227,777

TREATMENT OF RUBBER

Ernest Harold Farmer, Radlett, and Jack Wheeler Barrett, Knockholt, England, assignors to The British Rubber Producers' Research Association, London, England, a corporation of Great Britain No Drawing. Application October 12, 1938, Serial No. 234,720. In Great Britain September 22, 1937

8 Claims. (Cl. 260—768)

This invention relates to the preparation of modified rubbers.

Much of the difficulty in obtaining chemically-modified rubbers arises from the lack of reactivity of the rubber molecules towards desired substances. But although rubber may not react directly with such desirable substances, the effect desired may be attained either by combining the rubber first with reagents or substances which owing to their nature will procure or facilitate combination of the product with the desirable substances in subsequent reactions, or by carrying out the reactions between rubber and the desirable substances in the presence of suitably reactive substances which are capable not only of combining with rubber but in so combining afford a means of linking the rubber molecules to those of the desirable substances. In this latter case it will be understood that the reactive substance may combine first with the desirable substance and then with the rubber, but ordinarily the order of combination is indeterminable and immaterial.

According to the present invention reactive derivatives are obtained by combining maleic anhydride with rubber, conveniently by bringing together the rubber dissolved in a suitable solvent such as toluene, xylene, decalin, cyclohexane or benzene, preferably in dilute solution, with the maleic anhydride and a suitable catalyst or condensing agent such as benzoyl peroxide and maintaining the mixture for a period at a suitable temperature.

Although under these conditions maleic anhydride will combine with rubber, the proportions in which the two substances are taken is a matter of considerable importance, since increase in the proportion of maleic anhydride employed in relation to the rubber appears generally to enhance the degree of reactivity of the individual rubber molecules towards the anhydride reagent, the limit of such reactivity being apparently reached when each $C_5H_8$ unit of the rubber molecules combines with one molecule of maleic anhydride. Thus by varying the proportion of rubber to maleic anhydride taken, products are obtained ranging from elastic rubber-like materials on the one hand, through fibrous substances, to brittle resins on the other hand. Combination takes place with considerable readiness when the rubber/maleic anhydride ratio lies between 2:1 and 3:1 (i. e., 2 or 3 $C_5H_8$ units to 1 molecule of maleic anhydride $C_4H_2O_3$).

The proportion of the condensing agent relative to the quantities of rubber and maleic anhydride taken is also a matter of importance, since in the case of benzoyl peroxide the extent of reaction (and hence the yield of reaction product) tends to increase materially with increase in the proportion of the condensing agent employed. Such increases in the yields of reaction products have been observed to occur up to high relative proportions of the condensing agent, e. g., up to a proportion of benzoyl peroxide equivalent to 30% by weight of the rubber taken, but ordinarily comparatively low proportions of the condensing agent, e. g., from 0.5 to 10% of the weight of rubber taken, suffices to give useful products.

The nature of the solvent employed, and the concentration of the reactants in the solvent both have a material influence on the combination of the rubber with the maleic anhydride. High concentrations of the reactants in the solvent seem to promote objectionable gelling during reaction. The nature of the solvent also may have some influence on the gelling tendency, but the difference in the effects of different solvents lies mainly in their intrinsic solvent capacities for the reactants and the condensation products.

Prolonged heating of the reaction mixture (e. g., in excess of 18 hours) does not seem to increase materially the proportions of rubber and maleic anhydride which combine, but the duration of heating appears to affect the solubility of the product.

No pronounced improvement in yield has been observed to occur when reaction is conducted at a higher temperature than 80–90°.

The products as a rule differ considerably from rubber in their solubilities in solvents. The derivatives as a rule are more readily brought into solution when freshly precipitated than when dry. Generally speaking they pass into solution much less readily than the rubber does, particularly when the content of combined maleic anhydride is large; a very high anhydride content makes them intractable.

The rubber-maleic anhydride products undergo change when heated with reagents which might be expected to attack the anhydride groupings incorporated in these substances. For example, they react with aniline, caustic alkalies and alcohols when heated with these reagents in a suitable medium. Furthermore it is found that by heating together rubber, maleic anhydride and one or other of the members of the group of vinyl compounds, as exemplified by styrene, vinyl acetate and α-methylacrylic ester, in a suitable solvent and in presence of a small proportion of benzoyl peroxide to act as condensing agent, there is formed in each case a resinous product which appears to be a homogenous material formed by union of rubber, maleic anhydride and the vinyl compound, and which differs in characteristics and yield from the products obtained by heating together in a suitable medium and in presence of a small proportion of benzoyl peroxide (a) Rubber and maleic anhydride, and (b) Maleic anhydride and the vinyl compound.

The following examples will serve to illustrate the flexibility of the process of preparation according to the invention.

Example 1

A mixture composed of 7 grams of milled crepe rubber dissolved in 70 grams of xylene, 10 grams of maleic anhydride (i. e., 1 mol to each $C_5H_8$— unit of the rubber), 0.5 grams of benzoyl peroxide, and 100 grams of xylene was refluxed for 6 hours and then, after allowing to cool to room temperature, was poured into vigorously-stirred alcohol. A faintly yellow powder was precipitated, and this was filtered off and dried in a steam oven. The yield of the product was 10 grams, but about 7 grams of crude maleic acid was recoverable from the precipitation liquor.

The product dissolved in benzene to give at 5% strength a clear solution, and this solution when poured into well-stirred alcohol, gave a powder which was quite white in colour and was still soluble in benzene.

Example 2

With the same reactants as in Example 1, save that the amount of maleic anhydride was reduced to 3.5 grams (i. e., 1 mol. to every three $C_5H_8$—units of the rubber), the operation was conducted as before, except that the duration of refluxing was increased to 9 hours. The product when isolated as in Example 1 was similar to that obtained in Example 1, but in this case no significant amount of maleic anhydride was recoverable.

Example 3

A mixture composed of 7 grams of milled crepe rubber dissolved in 70 grams of benzene, 3.5 grams of maleic anhydride, 0.5 grams of benzoyl peroxide, and 100 grams of benzene was heated for 7 hours on a water bath at 75–80° C. The mixture, after cooling, was poured slowly into well stirred alcohol. A fibrous, white solid was precipitated, which after being dried, was soluble in acetone and (with swelling) in benzene. If in this preparation the reactants were heated for 24 hours instead of 7 hours, the product then obtained swelled only slightly and was nearly insoluble in benzene, but swelled considerably and rapidly in aniline.

When a sample of this product was heated at 80–100° C. overnight with excess of aniline a thick jelly was produced, from which an almost white nitrogenous powder was obtained on pouring into well-stirred alcohol, filtering off the precipitate and drying.

When a sample was heated for 3–4 hours at 160–180° C. with excess of potassium hydroxide dissolved in amyl alcohol, a white potassium salt was formed. This salt when left in contact with water swelled to above six times its bulk, but regained its former bulk after being dried.

Example 4

275 grams of maleic anhydride, 4 kilograms of a 10 percent solution of rubber in toluene (containing 400 grams of rubber) and 28 grams of benzoyl peroxide were mixed together in 9.2 litres of toluene and heated on a steam bath overnight. The toluene was removed by distillation in steam and the residue cut into small fragments, which were washed in running water and finally dried for 8 hours in a steam oven. Yield of product 228 grams. The product dissolved fairly readily in the liquid sold under the registered trade mark Tetralin but was insoluble in benzene, toluene and acetone.

Example 5

A solution of 5 grams of milled crepe rubber, 3.6 grams of maleic anhydride and 0.05 grams of benzoyl peroxide in 100 grams of toluene was heated on a steam bath for 18 hours. Slight gelling occurred but the gel disintegrated when more toluene was added to the product after it had cooled. On stirring the reaction mixture into 800 cc. of methylated spirit, a rubbery product was precipitated which collected round the stirrer. This product after being dried in vacuo at room temperature was tough, very rubbery and not tacky. Yield 5.3 grams.

When the experiment was repeated with a change in the amount of benzoyl peroxide from 0.05 grams to 0.1 grams the product was rubbery, non-tacky and very similar to the foregoing one.

Example 6

A solution of 6 grams of milled crepe rubber, 4.4 grams of maleic anhydride and 0.24 grams of benzoyl peroxide in 200 cc. of toluene was heated for 18 hours on a steam bath. The reaction mixture when stirred into excess of methylated spirit gave a product which adhered to the stirrer and which when dried in vacuo at room temperature formed a sticky solid. Yield 6.3 grams.

When the experiment was repeated with the modification that the proportion of benzoyl peroxide was increased to 0.6 grams the product was then a white non-rubbery powder. Yield 7.5 grams.

Example 7

A solution of 7 grams of milled crepe rubber, 10 grams of maleic anhydride and 0.21 grams of benzoyl peroxide in 230 grams of toluene was heated for 18 hours on a bath maintained at 90° C. The reaction mixture was precipitated with brisk stirring into four times its volume of alcohol. The precipitate was filtered, washed and dried to constant weight in vacuo at 70° C. The product was a coarse, fibrous and tough material, intermediate in character between rubber and resin. Yield 8.7 grams.

Example 8

A solution of 10 grams of milled crepe rubber, 33.2 grams of maleic anhydride, and 1 gram of benzoyl peroxide in 300 grams of toluene was heated for 18 hours at 90° C. The product isolated by precipitation into alcohol formed when dried at room temperature in vacuo a yellow brittle resin. Yield 18.8 grams.

Example 9

The product formed by heating together for 18 hours at 100° C. a 3% solution of rubber in toluene with maleic anhydride (ratio $C_5H_8$/maleic anhydride=2) and a quantity of benzoyl peroxide equal to 10% of the weight of rubber taken was isolated by pouring the reaction mixture with stirring into excess of alcohol and drying the precipitate in vacuo. The powdery material was inappreciably soluble in methyl or ethyl alcohol, but entered slowly into reaction with these reagents at the boiling point of the alcohol. Thus when 9.63 grams of the material was refluxed for 18 hours with 200 cc. of methanol, about one fifth of the whole dissolved, the dissolved material (isolated by evaporating the solvent) and undissolved material together weighing after each had been thoroughly dried 10.41 grams. The gain in weight thus observed appeared to be due to extensive esterification of the rubbery-maleic anhydride compound by the methanol.

By the present invention reactive derivatives of rubber readily combining with other substances such as glycols or tetramethylene diamine to furnish commercially useful products are obtained.

What we claim is:

1. A process for the preparation of modified rubber derivatives or resins consisting in reacting maleic anhydride with rubber in solution and maintaining the mixture at a temperature of 70 to 100 degrees centigrade for a period of several hours.

2. A process for the preparation of modified rubber derivatives or resins according to claim 1 wherein the reaction is carried out in the presence of a peroxide catalyst or condensing agent.

3. A process for the preparation of modified rubber derivatives or resins according to claim 1 wherein the reaction product is subsequently precipitated with alcohol.

4. A process for the preparation of modified rubber derivatives or resins according to claim 1 wherein the reaction product is obtained by distillation of the solvent.

5. A process for the preparation of modified rubber derivatives or resins according to claim 1 wherein the reaction is effected with the rubber in dilute solution in toluene, xylene, decalin, cyclohexane or benzene.

6. A process for the preparation of modified rubber derivatives or resins according to the preceding claim 1, wherein benzoyl peroxide is employed as catalyst or condensing agent.

7. A process according to claim 1 wherein the condensing agent is benzoyl peroxide and is not more than 30% by weight of the rubber.

8. A process according to the preceding claim 1 wherein the rubber maleic anhydride ratio lies between 2 and 3 isoprene ($C_5H_8$) units to one unit of maleic anhydride ($C_4H_2O_3$).

ERNEST HAROLD FARMER.
JACK WHEELER BARRETT.